United States Patent [19]

Aoki et al.

[11] Patent Number: 5,035,157
[45] Date of Patent: Jul. 30, 1991

[54] METHOD OF SHIFT CONTROL IN AN AUTOMATIC TRANSMISSION

[75] Inventors: Takashi Aoki, Saitama; Satoshi Terayama, Tokyo; Junichi Miyake, Saitama, all of Japan

[73] Assignee: Honda Giken Kogyo Kabushiki Kaisha, Tokyo, Japan

[21] Appl. No.: 309,606

[22] Filed: Feb. 10, 1989

[30] Foreign Application Priority Data

Feb. 10, 1988 [JP] Japan ................... 63-029609

[51] Int. Cl.$^5$ ............................................. F16H 59/18
[52] U.S. Cl. .................................................... 74/866
[58] Field of Search ................. 74/856, 857, 861, 862, 74/863, 865, 866

[56] References Cited

U.S. PATENT DOCUMENTS

| | | | |
|---|---|---|---|
| 4,122,732 | 10/1978 | Chana | 74/863 |
| 4,226,295 | 10/1980 | Rembold et al. | 74/866 X |
| 4,551,802 | 11/1985 | Smyth | 74/866 X |
| 4,599,917 | 7/1986 | Leorat et al. | 74/866 |
| 4,692,866 | 9/1987 | Kosuge | 74/866 X |
| 4,698,763 | 10/1987 | Smyth | 74/866 X |
| 4,706,522 | 11/1987 | Nitz | 74/866 |
| 4,712,452 | 12/1987 | Hibino et al. | 74/866 |
| 4,718,309 | 1/1988 | Moriya | 74/866 |
| 4,823,646 | 4/1989 | Yoshimura et al. | 74/866 |
| 4,841,815 | 6/1989 | Takahashi | 74/866 |
| 4,849,899 | 7/1989 | Cote et al. | 74/866 X |
| 4,977,797 | 12/1990 | Aoki et al. | 74/866 |

FOREIGN PATENT DOCUMENTS 61-1189354 8/1986 Japan .

Primary Examiner—Allan D. Hermann
Assistant Examiner—Khoi Q. Ta
Attorney, Agent, or Firm—Lyon & Lyon

[57] ABSTRACT

A method of shift control in an automatic transmission, wherein a shift map has a shift-up line and a shift-down line between each gear change which is used to conduct the shift control with a hysteresis zone being established between each shift-up line and shift-down line. The method includes the steps of shifting down a speed range when a point representing a traveling state on the shift map moves in the lower vehicle speed direction and crosses the shift-down line, shifting up a speed range when the point moves in the higher vehicle speed direction and crosses the shift-up line, and shifting down the speed range when the point is in the hysteresis zone after a shift and also the increasing rate of the engine power is greater than a specified value.

5 Claims, 4 Drawing Sheets

METHOD OF SHIFT CONTROL IN AN AUTOMATIC TRANSMISSION

BACKGROUND OF THE INVENTION

The present invention relates to a method of shift control in an automatic transmission to automatically shift the speed range corresponding to changes in engine power and vehicle speed.

In an automatic transmission, the speed range is automatically shifted corresponding to changes in traveling state to attain desirable traveling characteristics. A point representing a traveling state is shown on a shift map having shift-up lines and shift-down lines which are established based on vehicle speeds and engine powers (or throttle openings, intake vacuum pressures, etc.). The shift control is conducted based on the movement of the point representing the traveling state on the shift map. Such a control method as described above is disclosed in the Japanese Patent Laid-Open Publication No. 61(1986)-189354.

The shift map is established considering many road conditions such as open roads, highways and mountainous roads. Because of so many conditions to be considered, the establishment of the map is complicated.

The shift lines on the shift map are established so as to cope with the many conditions. In order to fully utilize the engine power, the speed range is shifted up when a point representing the traveling state moves toward higher speed direction crossing the shift line, and it is shifted down when the point moves toward lower speed direction crossing the shift line. If the up-shift and down-shift are determined based on one common shift line, the up-shift and the down-shift can happen frequently to deteriorate the driving feeling when the point moves in the vicinity of the shift line. Accordingly, the shift-up line is usually established on higher speed side than the shift-down line. A hysteresis zone established between the lines can moderate the frequency of the shifts.

It is desirable to include a hysteresis zone to reduce the frequency of the shifts. However, if the zone is too broad, the down-shift tends to lag behind in case of "kick-down." Therefore, the shift response to the kick-down becomes slow deteriorating shift characteristics.

SUMMARY OF THE INVENTION

An object of the present invention is to provide a method of shift control wherein excessively frequent shifts can be moderated.

Another object of the present invention is to provide a method of shift control wherein the speed range can be shifted down quickly in case of "kick-down" (when a throttle pedal is rapidly depressed).

In order to achieve the objects, in the method of shift control according to the present invention, up-shifts and down-shifts of the speed range are normally controlled based on a shift map having shift-up lines, shift-down lines and hysteresis zones therebetween. When a point representing a traveling state is in the hysteresis zone after a shift and also an increasing rate of a signal corresponding to the engine power is greater than a specified value, the speed range is shifted down.

In the shift control based on the above method, the speed range is normally shifted up or down when the point crosses the shift-up line or the shift-down line. Since a hysteresis zone is established between the lines, excessively frequent shifts are prevented. However, when the throttle pedal is rapidly depressed (for example, in case of kick-down), the increasing rate of a signal corresponding to the engine power (for example, a signal corresponding to a depression of the throttle pedal or to an opening of a throttle valve) is detected. If the rate is greater than the specified value and also the point representing the traveling state is in the hysteresis zone, the speed range is shifted down even if the point does not cross the shift-down line toward low speed direction. As a result, the shift response is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein.

DETAILED DESCRIPTION OF THE INVENTION

Figure 1:
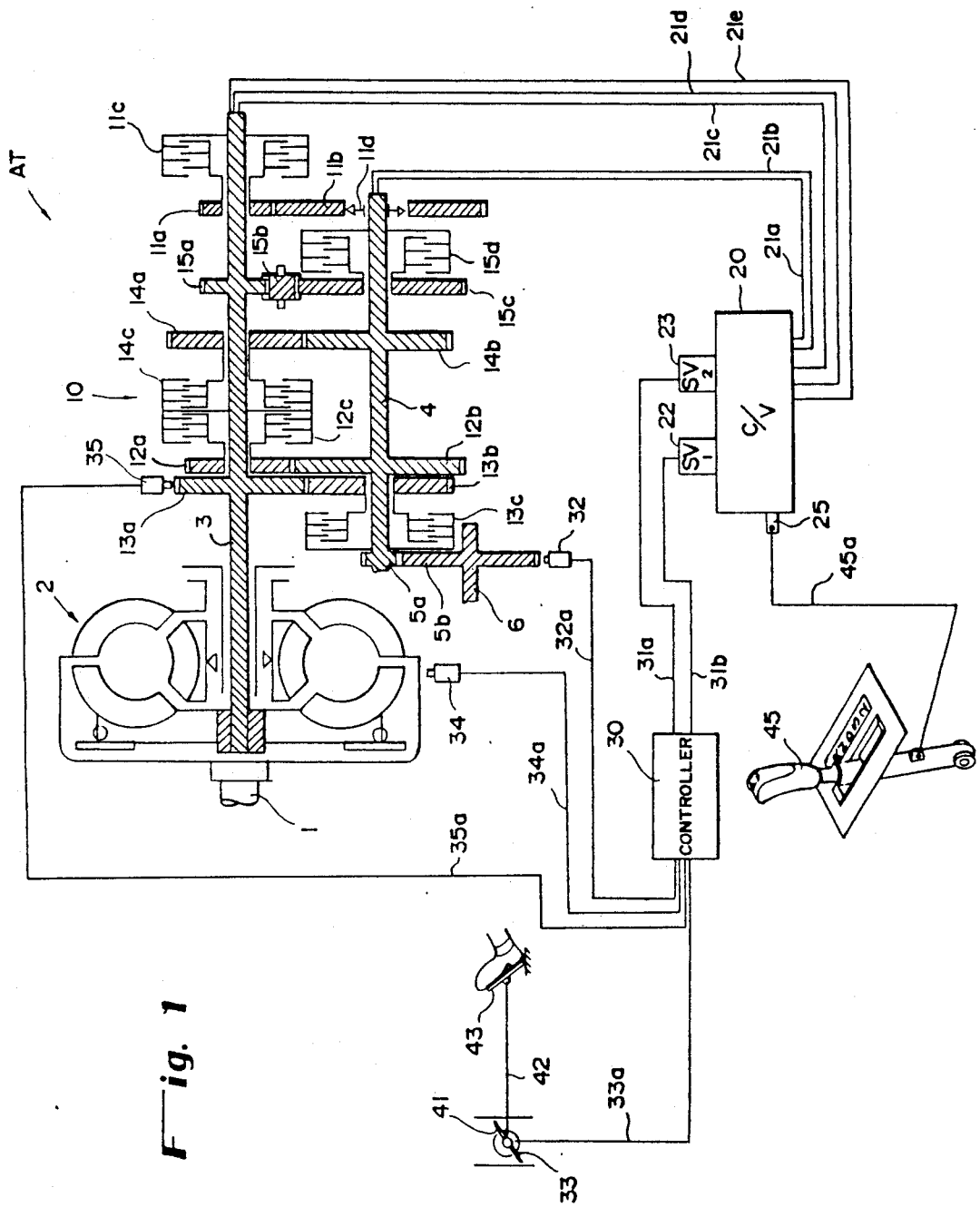
FIG. 1 is a diagrammatic view of an automatic transmission whose speed range is controlled by a method in accordance with the present invention.

FIG. 1 is a diagrammatic view illustrating the construction of an automatic transmission whose speed range is shifted based on a method according to the present invention.

In this transmission AT, the engine output power is transmitted from the engine output shaft 1 to the transmission output shaft 6 through a torque converter 2 and a speed reduction mechanism 10 having a multiplicity of gear trains by which the rotational speed is changed. Specifically, the output power of the torque converter 2 is transmitted to the main shaft 3. Then it is transmitted to the counter shaft 4 arranged in parallel with the main shaft 3 after it is changed in speed by means of one of five gear trains disposed between the main shaft 3 and the counter shaft 4. The output power is further transmitted to the output shaft 6 through output gear train 5a and 5b disposed between the counter shaft 4 and the output shaft 6.

The five gear trains disposed between the main shaft 3 and the counter shaft 4 include a first range gear train 11a and 11b, a second range gear train 12a and 12b, a third range gear train 13a and 13b, a fourth range gear train 14a and 14b, and a reverse range gear train 15a, 15b and 15c. The gear trains are respectively provided with hydraulically operable clutches 11c, 12c, 13c 14, and 15d to allow the transmission of the power through the gear trains. The first range gear 11b is provided with a one-way clutch 11d. Thus, by selectively putting one of these five gear trains in operation, a desirable gear ratio control may be achieved.

The five hydraulic clutches 11c through 15d mentioned above are selectively operated by the pressurized hydraulic fluid supplied from a hydraulic control valve 20 through hydraulic lines 21a, 21b, 21c, 21d and 21e.

The operation of the hydraulic control valve 20 is controlled in accordance with the operation of a manual valve 25, which is connected to a shift lever 45 by means of a wire 45a, and the operation of two solenoid valves 22, 23. The shift lever is manually operated by a driver.

The solenoid valves 22, 23 are turned on and off in response to operational signals sent from a controller 30. A vehicle speed signal detected by a vehicle speed sensor 32 based on the rotation of the output gear 5b and a throttle opening signal representing an opening of an engine throttle 41 detected by a throttle opening sensor 33 are sent to the controller 30 through signal lines 32a and 33a. The engine throttle 41 is connected to the throttle pedal 43 by means of a wire 42. Therefore, the depression of the throttle pedal can be found based on the throttle opening detected.

The method of shift control in the above transmission is described hereinafter.

The shift control is carried out in response to the shift ranges which are determined by the manual valve 25 of the hydraulic control valve 20. The shift ranges include P, R, N, D, S and 2 ranges. In P-range or N-range, all the hydraulic clutches 11c through 15d are disengaged creating a neutral state of the transmission. In R-range, the reverse clutch 15d is engaged establishing the reverse range. In D-range, S-range or 2-range, the shift control is carried out based on a shift map.

Figure 3:
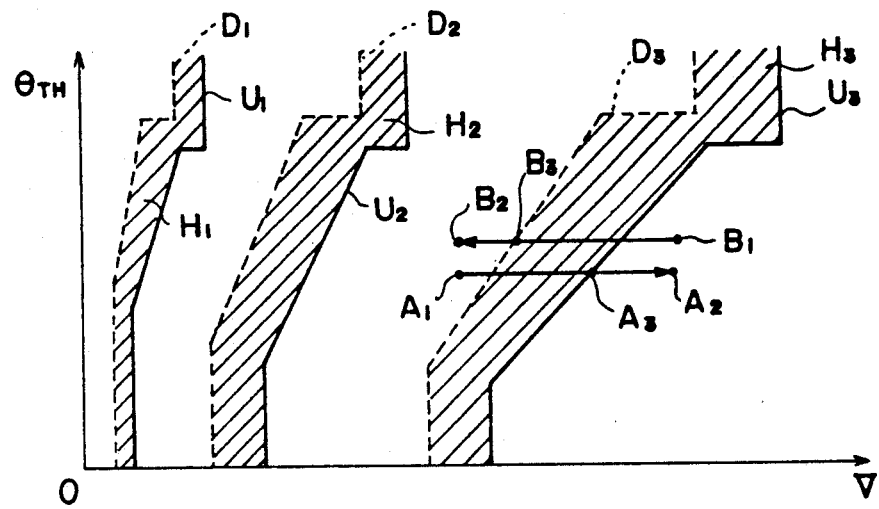
FIGS. 3 and 4 are graphs respectively showing a shift map used for the above method.

As an example, the shift control based on the shift map in D-range is described hereinafter. As shown in FIG. 3, the shift map which shows the relation between the vehicle speed V and the throttle opening $\theta$th in D-range has a shift-up line $U_1$ and a shift-down line $D_1$ between the first speed range and the second speed range, a shift-up line $U_2$ and a shift-down line $D_2$ between the second speed range and the third speed range, and a shift-up line $U_3$ and a shift-down line $D_3$ between the third speed range and the fourth speed range. The shift-up lines $U_1$, $U_2$ and $U_3$ are respectively established at a higher vehicle speed side than the shift-down lines $D_1$, $D_2$, $D_3$, creating hysteresis zones $H_1$, $H_2$ and $H_3$.

The present traveling state is determined by the controller 30 based on a vehicle speed signal and a throttle opening signal sent through the lines 32a, 33a and is expressed as a point on the shift map. The movement of the point is traced on the map. When the point crosses the shift-up line toward high speed direction or the shift-down line toward low speed direction, operational signals to shift up or to shift down are sent from the controller to the solenoid valves 22, 23 through the signal lines 31a, 31b.

Figure 2:
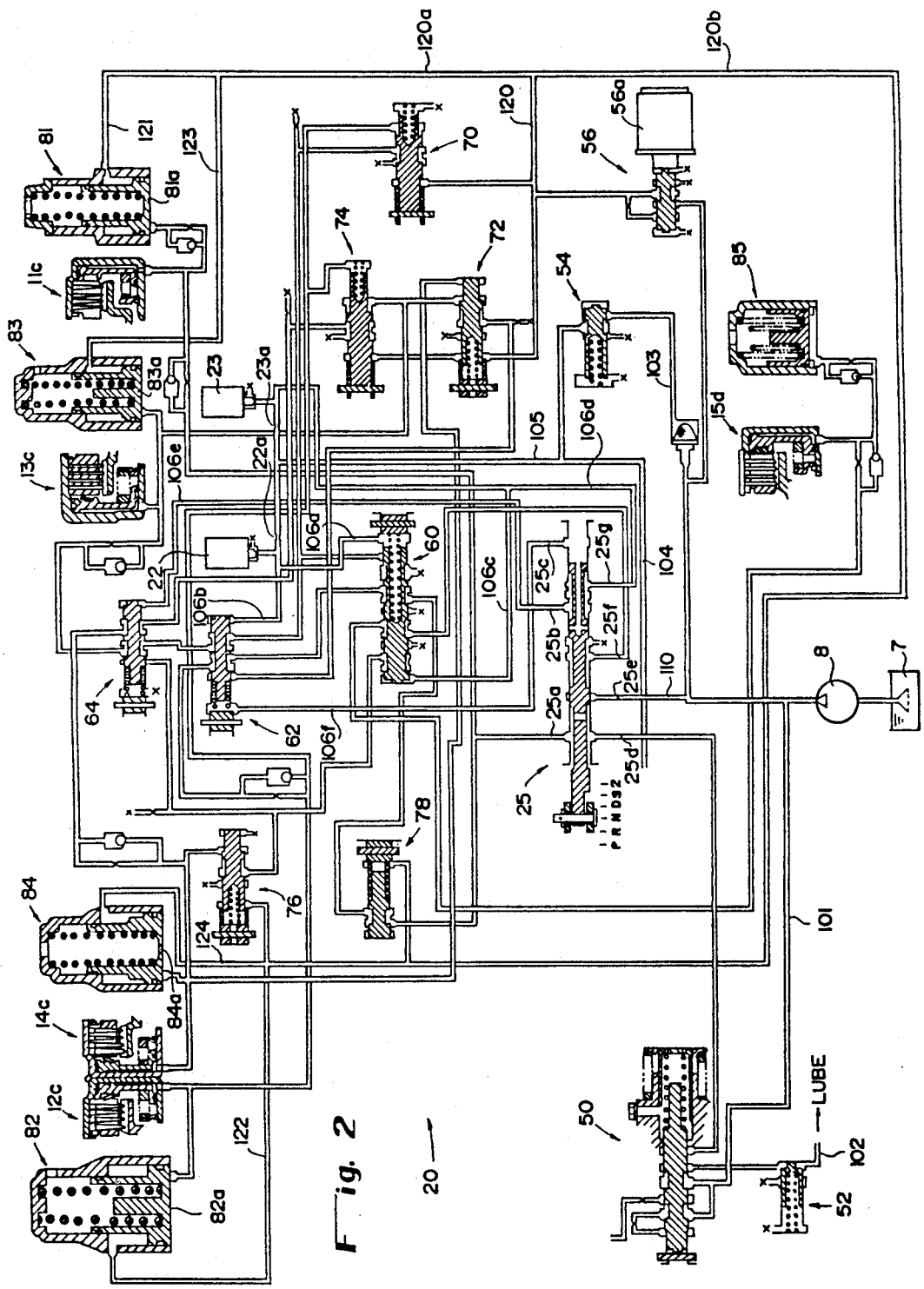
FIG. 2 is a hydraulic circuit diagram of a control valve used in the above automatic transmission.

The on-off actuations of the solenoid valves 22, 23 actuate the hydraulic control valve 20. As a result, the pressurized fluid is selectively supplied to the hydraulic clutches 11c, 12c, 13c, 14c and 15d to shift up or shift down. The hydraulic control valve is explained hereinafter referring FIG. 2.

In the control valve 20, the operational fluid supplied by the pump 8 from an oil sump 7 is led through a line 101 into a regulator valve 50 which functions to regulate the fluid pressure to a predetermined line pressure. The fluid having the line pressure is led to the manual valve 25 through the line 110. Then the fluid is supplied, via various valves in the control valve 20, to a selected one of hydraulic clutches 11c, 12c, 13c, 14c and 15d in accordance with changes of traveling state thereby controlling the operation of the clutch.

These various valves in the control valve 20 will be described below. A relief valve 52 is disposed downstream of the regulator valve 50 in a line 102 and prevents the pressure of the fluid for lubrication supplied to the transmission through line 102 from exceeding a predetermined pressure. A modulator valve 54 reduces the line pressure of the fluid supplied through a line 103 to a predetermined modulator pressure, and supplies this operating fluid having the modulator pressure to a lock-up clutch control circuit (not shown), via a line 104, to control the lock-up clutch in the torque converter 2. The fluid having modulator pressure is also supplied to the first and second solenoid valves 22, 23 through a line 105 for shift control.

A manual valve 25 is operable in response to the shift lever manipulated by the driver, and may take either one of 6 positions, P, R, N, D, S, and 2. The fluid having the line pressure from the line 110 is selectively supplied to the lines 25a through 25g in correspondence with the above positions.

A 1-2 shift valve 60, a 2-3 shift valve 62, and a 3-4 shift valve 64 are operated when the manual valve 25 is in one of D, S, or 2 positions by the action of the modulator pressure supplied through lines 106a to 106f in accordance with the ON-OFF actuation of the first and the second solenoid valves 22 and 23. These valves 60, 62, 64 are provided for controlling the supply of the line pressure fluid to the first through the fourth clutches 11c, 12c, 13c and 14c.

The lines 106a, 106b communicate with the first solenoid valve 22 and also with the line 105 through an orifice 22a. When a power supply to the solenoid valve 22 is "off," the drain port in the solenoid valve 22 is closed, thereby supplying the operational fluid having the modulator pressure from the line 105 to the lines 106a, 106b. When the power supply is "on," the drain port is opened, thereby depressurizing the fluid in the lines 106a, 106b to "zero." The lines 106c to 106f communicate with the second solenoid valve 23 and also with the line 105 through an orifice 23a. When a power supply to the solenoid valve 23 is "off," the drain port in the solenoid valve 23 is closed, thereby supplying the operational fluid having the modulator pressure from the line 105 to the lines 106c to 106f. When the power supply is "on," the drain port is opened, thereby depressurizing the fluid in the lines 106c through 106f to "zero."

The line 106a is connected to the right end of the 1-2 shift valve 60. The line 106b is connected to the right end of the 2-3 shift valve 62. The line 106c is connected to the left end of the 1-2 shift valve 60. The line 106e is connected to the right end of the 3-4 shift valve 64. The line 106f is connected to the left end of the 2-3 shift valve 62. The lines 106e, 106f can communicate with the second solenoid valve 23 via the manual valve 25 and the line 106d. When the supply of the fluid having the modulator pressure from the line 105 to the lines 106a through 106f is controlled by the on-off operational control of the first and the second solenoid valves 22, 23, the operations of the 1-2, 2-3 and 3-4 shift valves can be controlled. As a result, the fluid having the line pressure supplied from the line 110 via the manual valve 25 can be selectively supplied to the hydraulic clutches 11c, 12c 13c and 14c to realize a desirable shift control.

The linear solenoid valve 56 includes a linear solenoid 56a. The operational force of the solenoid 56a can be controlled by controlling current-flow through the solenoid 56a to control the hydraulic pressure of the fluid supplied to the line 20. The current through the solenoid 56a is normally controlled so as to produce a hydraulic pressure corresponding to the engine throttle opening (a throttle pressure).

The clutch-pressure control valve 78 is disposed in a line between the manual valve 25 and the 1-2 shift valve 60 and is operated in correspondence with the throttle pressure regulated by the linear solenoid valve 56. Accordingly, the line pressure of the fluid supplied to the hydraulic clutches 11c, 12c 13c and 14c through the shift valves 60, 62 and 64 is regulated by the clutch-pressure control valve 78 in correspondence with the throttle pressure, in other words, in correspondence with the engine output power. The actual torque capacity of the hydraulic clutches can be controlled to be minimum values corresponding to the actual engine output power.

The control valve 20 includes a first, a second, a third and a fourth orifice control valve 70, 72, 74, 76. These orifice control valves relieve the hydraulic pressure in the pre-shift clutch during shifting in a manner timed to the building up of the hydraulic pressure in the post-shift clutch. The first orifice control valve 70 relieves the pressure in the hydraulic chamber of the third clutch 13c at the time of down-shift from the third speed range to the second. The second orifice control valve 72 relieves the pressure in the hydraulic chamber of the second clutch 12c at the time of up-shift from the second speed range to the third or from the second to the fourth. The third orifice control valve 74 relieves the pressure in the hydraulic chamber of the fourth clutch 14c at the time of down-shift from the fourth speed range to the third or from the fourth to the second. The fourth orifice control valve 76 relieves the pressure in the hydraulic chamber of the third clutch 13c at the time of up-shift from the third speed range to the fourth.

The hydraulic chambers of the above clutches 11c, 12c, 13c and 14c respectively communicate with pressure-receiving chambers of accumulators 81, 82, 83 and 84. Lines 121, 122, 123 and 124 respectively communicate with back-pressure chambers of the accumulators 81, 82 83 and 84. Piston members 81a, 82a, 83a and 84a respectively divide the spaces in the accumulators into the pressure-receiving chambers and the back-pressure chambers which stand opposite to each other. The lines 121, 122, 123 and 124 communicate with a linear solenoid valve 56 via lines 120a, 120b and 120.

Therefore, the control of the current-flow through the linear solenoid 56a allows control of the hydraulic pressures in the back-pressure chambers of the accumulators 81 through 84. As a result, the hydraulic pressure in the engaging clutch (post-shift clutch) can be controlled during shifting.

In the hydraulic control valve 20 as described above, operations of the manual valve 25 in accordance with operation of the shift lever 45 and on-off operation of the solenoid valves 22 and 23 actuate the above-mentioned valves to control selective supply of the line pressure to the hydraulic clutches 11c, 12c, 13c and 14c, realizing an automatic shift control.

The shifts (shift-up and shift-down) between the third speed range and the fourth speed range in accordance with the movement of the point representing the traveling state on the shift map is explained hereinafter.

When the vehicle speed is increased with a constant throttle opening during running on a flat road, the point $A_1$ representing the initial traveling state (the speed range is in the third range at this time) moves rightward on the shift map shown in FIG. 3 toward the point $A_2$. During this movement, the point crosses the shift-up line $U_3$ at point $A_3$ and the speed range is shifted up from the third range to the fourth.

When the vehicle speed is decreased with a constant throttle opening during running on an ascending road, for example, the point $B_1$ representing initial traveling state moves leftward on the shift map toward the point $B_2$. During this movement, the point crosses the shift-down line $D_3$ at point $B_3$ and the speed range is shifted down from the fourth speed range to the third.

Since the shift-down line $D_3$ is placed on a lower speed side than the shift-up line $U_3$ establishing the hysteresis zone $H_3$, the vehicle speed at the down-shift is lower than that at the up-shift if the throttle opening is not changed. Accordingly, even if the vehicle speed is reduced slightly immediately after the shift-up, the shift-down is not introduced, thereby preventing frequent shifts.

As an example of a kick-down shift control, the shift control in case of kick-down during running at fourth speed range is explained with reference to FIGS. 4 and 5.

Figure 4:
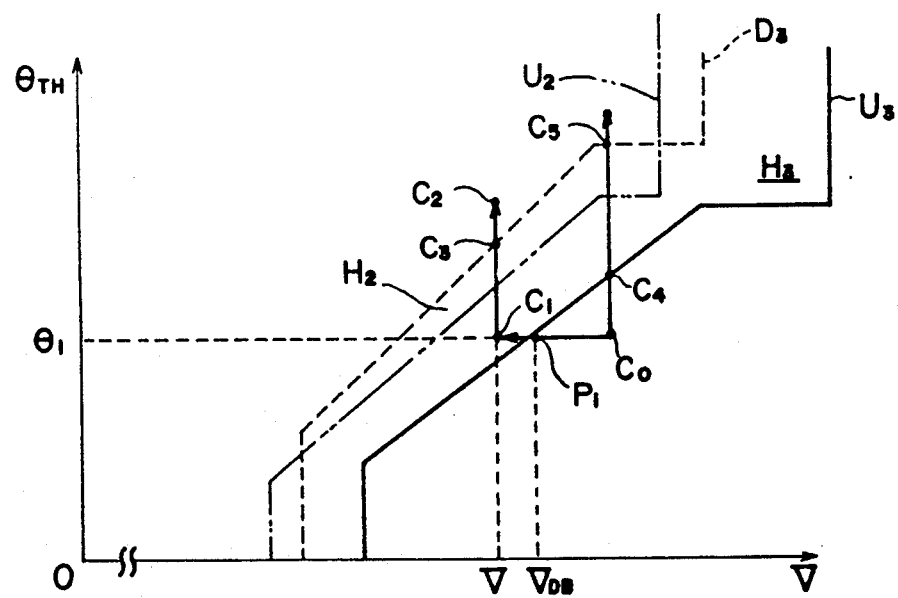
Figure 5:
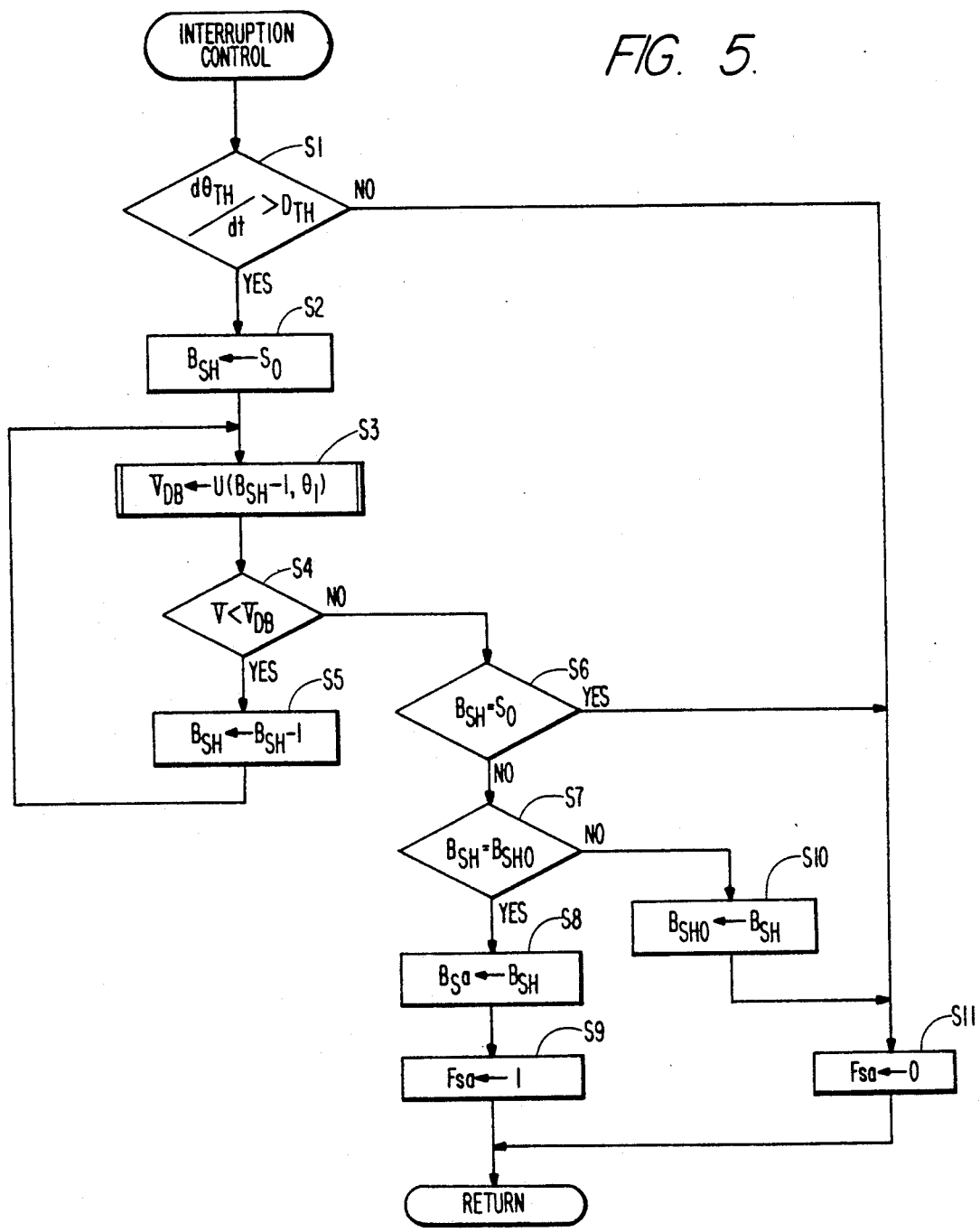
FIG. 5 is a flow chart showing the above method.

In FIG. 4, a shift map having a shift-up line $U_3$ and a shift-down line $D_3$ between the third speed range and the fourth speed range is shown.

Let's consider a case where the initial point $C_0$ at the fourth speed range moves to the point $C_1$ and then the throttle pedal is rapidly depressed to kick down the speed range.

Since the throttle pedal 43 is connected to the throttle valve 41 by means of the wire 42, the opening of the throttle valve 41 is increased as the pedal 43 is depressed. The point representing the traveling state moves rapidly from $C_1$ toward $C_3$. When the point crosses the shift-down line $D_3$, a signal to shift down the speed range is sent from the controller 30 to the solenoid valves 22, 23.

The above-mentioned control is an ordinary control. The method according to the present invention includes an interruption control which is explained hereinafter.

In the control, first, it is determined whether an increasing rate ($=d\theta_{TH}/dt$) of the throttle valve opening $\theta_{TH}$ is greater than a specified threshold value "$D_{TH}$" or not (Step S1). If it is greater than the threshold value $D_{TH}$, a value $S_o$ representing the present speed range (the fourth speed range) is stored in a buffer memory $B_{SH}$ in Step S2. Then the hysteresis judging speed $V_{DB}$ at the point $P_1$ which is on the shift-up line $V(B_{SH}-1)$ from the pre-shift speed range (the third speed range) to the post shift speed range (the fourth speed range) and corresponds to the present throttle opening $\theta_1$ in FIG. 4 is determined in Step S3. The hysteresis judging speed $V_{DB}$ is a function $\{V(B_{SH}-1), \theta_1\}$ of the value $(B_{SH}-1)$ and the throttle opening $\theta_1$. The present vehicle speed V is compared with the hysteresis judging speed $V_{DB}$ in Step S5.

In the case that the present speed V is equal to or greater than the judging speed $V_{DB}$ ($V > = V_{DB}$), since the point representing the traveling state is outside the hysteresis zone $H_3$ as shown in FIG. 4, the control goes to Step S6. On the other hand, in the case that the present speed V is less than the judging speed $V_{DB}$ ($V < V_{DB}$), since the point is in the hysteresis zone $H_3$, the control goes to Step S5 where a value representing lower speed range (the third speed range) is stored in the buffer memory $B_{SH}$. If the present speed is lower than the speed corresponding to the shift-down line $D_3$, the point is also outside the hysteresis zone $H_3$. In such a case, however, the speed range is shifted down based on the ordinary control.

When the value representing the lower speed range is stored in the buffer memory $B_{SH}$ in Step S5, a shift-down control could be conducted based on the value in the buffer memory. However, since the shift-up line $U_2$ from the second speed range to the third may be established in the hysteresis zone $H_3$ as shown by a chain line in FIG. 4, the control goes from Step S5 back to Step S3 where it is judged whether or not the point representing the present traveling state is in the hysteresis zone $H_2$ established between the second speed range and the third. If the point is in the hysteresis zone $H_2$, the value in the buffer memory $B_{SH}$ is replaced with a value representing further lower speed range (the second speed range).

In the above control flow from Step S3 to S5, a value representing the fourth speed range is stored in the buffer memory $B_{SH}$ when the point representing the traveling state is on the higher speed side of the shift-up line $U_3$, a value representing the third speed range is stored in the memory $B_{SH}$ when the point is in the hysteresis zone $H_3$ and on the higher speed side of the shift-up line $U_2$, and a value representing the second speed range is stored in the memory $B_{SH}$ when the point is in both the hysteresis zones $H_3$ and $H_2$. Then the control goes to Step S6.

In Step S6, it is judged whether or not the value stored in the buffer memory $B_{SH}$ is equal to the value of the present speed range $S_o$. If it is equal to the value of the present speed range, the control goes to Step S11 where the shift flag $F_{sa}$ is set to zero. If the value in the buffer memory $B_{SH}$ is not equal to that of the present speed range $S_o$, the value in the buffer memory $B_{SH}$ is compared with the value in the filter memory $B_{SHO}$. By this comparison, the value in the buffer memory $B_{SH}$ cannot be used unless the same value is stored in the buffer memory more than twice successively in this control flow. Accordingly, even if a wrong value is stored in the buffer memory because of a noise, a wrong shift based on the wrong value can be avoided. If the value in the buffer memory $B_{SH}$ is not equal to that in the filter memory $B_{SHO}$, the value in the buffer memory is stored in the filter memory at Step S10. Then the shift flag $F_{sa}$ is set to zero.

In the next step of the control flow, if the value in the buffer memory $B_{SH}$ is not changed, this value is equal to the value in the filter memory $B_{SHO}$ ($B_{SH}=B_{SHO}$). In such a case, the control goes from Step S7 to Step S8 where the value in the buffer memory is stored as a reference shift value $B_{sa}$. Then, the shift flag $F_{sa}$ is set to "1" (Step S9).

When the throttle pedal is rapidly depressed during running at the state of the point $C_1$, the shift flag $F_{sa}$ is set to "1" if the increasing rate of the throttle valve opening is greater than the specified value. The speed range is shifted down immediately based on the reference shift value $B_{sa}$. Accordingly, the speed range is shifted down from the fourth speed range to the third or to the second in correspondence with the value in the buffer memory $B_{SH}$.

In the above shift control, the throttle pedal is rapidly depressed when the point ($C_1$) representing the traveling state is in the hysteresis zone $H_3$. The similar shift control is carried out in case where the point is outside the hysteresis zone. For example, when the throttle pedal is depressed during running at the state of point $C_0$, the point moves upward (toward larger throttle opening with almost constant vehicle speed) in FIG. 4. Therefore, the speed range is normally shifted down when the point crosses the shift-down line $D_3$ (at $C_5$). However, if the increasing rate of the throttle valve opening is greater than the threshold value, the speed range is shifted down immediately after the point moved in the hysteresis zone $H_4$ (at $C_4$).

Though the increasing rate of the throttle valve opening is used to detect the increasing rate of the engine power in the above method, other data such as an increasing rate of a depression of the throttle pedal, an increasing rate of an intake vacuum pressure of the engine can be used.

Further, since the shift-down according to the above-mentioned interruption control is carried out only when the point representing the traveling state is in the hysteresis zone, the control logic is simple.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of shift control in an automatic transmission in a vehicle, wherein up-shifts and down-shifts are controlled based on a shift map having at least one shift-up line and at least one shift-down line, said shift map being established corresponding to a relation between vehicle speeds and engine throttle openings, said shift-up line being established on a higher vehicle speed side than said shift-down line and a hysteresis zone being established between said shift-up line and said shift-down line, comprising the steps of:

shifting down to a lower speed range when a point representing a traveling state of the vehicle on said shift map moves in a lower vehicle speed direction and crosses said shift-down line;

shifting up to a higher speed range when said point moves in a higher vehicle speed direction and crosses said shift-up line; and shifting down to a lower speed range when said point is in said hysteresis zone after a shift of speed range and when engine power is increasing at a rate which is greater than a specified value.

2. A method of shift control in an automatic transmission as defined in claim 1; wherein said engine power is detected based on a depression of a throttle pedal and the speed range is shifted down when said point is in said hysteresis zone after a shift-up of said speed range and also an increasing rate of said depression is greater than a specified value.

3. A method of shift control in an automatic transmission as defined in claim 1; wherein said engine power is detected based on an opening of a throttle valve and the speed range is shifted down when said point is in said hysteresis zone after a shift-up of said speed range and also an increasing rate of said opening is greater than a specified value.

4. A method of shift control in an automatic transmission as defined in claim 1; wherein first, second, third and fourth speed ranges can be set in said shift-gear mechanism and the shift-up lines and the shift-down lines are established between the first speed range and the second speed range, the second speed range and the third speed range, and the third speed range and the fourth speed range respectively.

5. A method of shift control in an automatic transmission in a vehicle, wherein up-shifts and down-shifts are controlled based on a shift map having at least one shift-up line and at least one shift-down line, said shift map being established corresponding to a relation between vehicle speeds and engine intake throttle opening, said shift-up line being established on a higher vehicle speed side than said shift-down line and a hysteresis zone being established between said shift-up line and said shift-down line, comprising the steps of:

shifting down to a lower speed range when a point representing a traveling state of the vehicle on said shift map moves in a lower vehicle speed direction and crosses said shift-down line;

shifting up to a higher speed range when said point moves in a higher vehicle speed direction and crosses said shift-up line; and shifting down to a lower speed range when said point is in said hysteresis zone after a shift of speed range and when engine power is increasing at a rate greater than a specified value.

* * * * *